United States Patent
Sigai et al.

(10) Patent No.: US 6,683,406 B2
(45) Date of Patent: Jan. 27, 2004

(54) LOW PRESSURE MERCURY VAPOR FLUORESCENT LAMPS

(75) Inventors: Gary Sigai, Salina, KS (US); Snehasish Ghosh, Seattle, WA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 17 days.

(21) Appl. No.: 10/179,365

(22) Filed: Jun. 24, 2002

(65) Prior Publication Data

US 2003/0234606 A1 Dec. 25, 2003

(51) Int. Cl.$^7$ .................................................. H01J 1/62
(52) U.S. Cl. ......................................... 313/486; 313/485
(58) Field of Search ............................. 313/109, 112, 313/220, 221, 486, 487, 485; 252/301.4 H, 301.4 P, 301.6 P

(56) References Cited

U.S. PATENT DOCUMENTS

| | | | |
|---|---|---|---|
| 2,976,249 A | 3/1961 | Rimbach et al. | 252/301.4 |
| 3,707,642 A | 12/1972 | Thornton, Jr. | 313/109 |
| 3,709,826 A | 1/1973 | Pitt et al. | 252/301.4 P |
| 3,748,518 A * | 7/1973 | Lewis | 313/109 |
| 4,447,756 A | 5/1984 | Kohmoto et al. | 313/487 |
| 4,806,824 A * | 2/1989 | Paynter et al. | 313/486 |
| 4,840,747 A | 6/1989 | Fan et al. | 252/301.4 R |
| 5,447,660 A | 9/1995 | Chau | 252/301.4 P |
| 5,612,590 A | 3/1997 | Trushell et al. | 313/487 |
| 5,898,265 A | 4/1999 | Woodward et al. | 313/486 |
| 6,483,234 B1 * | 11/2002 | Milewski | 313/486 |

FOREIGN PATENT DOCUMENTS

| | | |
|---|---|---|
| EP | 0769802 A2 | 4/1997 |
| JP | 56-112064 | 9/1981 |
| JP | 61293287 | 12/1986 |
| JP | 294193 A | 10/2002 |
| WO | 00/67295 | 11/2000 |

* cited by examiner

Primary Examiner—Don Wong
Assistant Examiner—Jimmy T. Vu
(74) Attorney, Agent, or Firm—Ernestine C. Bartlett

(57) ABSTRACT

A low mercury consumption electric lamp is provided having a layer of a luminescent material comprising a phosphor selected from the group consisting of: (a) cool white phosphor comprising calcium halophosphate activated with antimony and manganese having an average particle size of about 8 to about 12 microns; and (b) a two phosphor blend of about 50% white calcium halophosphate activated with antimony and manganese and about 50% blue halo calcium halophosphate activated with antimony, wherein the blue halo phosphor has an average particle size of about 6.6 to about 10 microns.

7 Claims, 1 Drawing Sheet

LOW PRESSURE MERCURY VAPOR FLUORESCENT LAMPS

FIELD OF THE INVENTION

This invention relates to low pressure mercury vapor fluorescent lamps.

BACKGROUND OF THE INVENTION

Low pressure mercury vapor lamps, more commonly known as fluorescent lamps, have a lamp envelope with a filling of mercury and rare gas to maintain a gas discharge during operation. The radiation emitted by the gas discharge is mostly in the ultraviolet (UV) region of the spectrum, with only a small portion in the visible spectrum. The inner surface of the lamp envelope has a luminescent coating, often a blend of phosphors, which emits visible light when impinged by the ultraviolet radiation.

There is an increase in the use of fluorescent lamps because of reduced consumption of electricity. To further reduce electricity consumption, there is a drive to increase efficiency of fluorescent lamps, referred to as luminous efficacy which is a measure of the useful light output in relation to the energy input to the lamp, in lumens per watt (LPW).

Thus, more efficient and longer life fluorescent lamps are desired. However, significant excess of mercury is introduced into the lamp to meet desired long lamp lifetime of 20,000 hours or more. This is necessary because different lamp components, such as the glass envelope, phosphor coatings and electrodes use up the mercury in the lamp. Such increased use of mercury is not desirable and is detrimental to the environment. Accordingly, there is a drive to reduce mercury consumption in fluorescent lamps without a reduction in the lamp life.

An example of a successful lamp with reduced mercury consumption is the Alto Econowatt fluorescent lamp. These lamps use large-particle cool-white halophosphate phosphor having an average particle size of about 12 to 16 microns and are doped with less mercury than other lamps to meet the TCLP requirement for non-hazardous waste. To continue to increase efficiency and to meet the rated life of these lamps, it is essential that the lamp and its components have low mercury consumption.

Similarly, fluorescent lamps of Daylight/Daylight Deluxe color have used a large-particle blue halo halophosphate phosphor as part of a two-component blend that uses a standard white phosphor or a warm-white phosphor as the other component. These lamps are doped with less mercury to meet the TCLP requirement for non-hazardous waste.

There is a continued need for fluorescent lamps with reduced mercury that pass the TCLP standards.

SUMMARY OF THE INVENTION

An object of the present invention is to provide fluorescent lamps with reduced mercury consumption.

The present invention accomplishes the above and other objects by providing an electric lamp having an envelope with an inner surface and at least one electrode, preferably two electrodes located at both ends of the envelope tube. The electrodes transfer electric power to generate ultraviolet radiation in the envelope which is filled with mercury and a charge sustaining gas. Preferably, the inner surface of the envelope is pre-coated with a metal oxide layer, such as an aluminum oxide layer, to reflect ultraviolet radiation back into the envelope.

A phosphor layer is formed over the aluminum oxide to convert the ultraviolet radiation to visible light. The phosphor layer for a F40T12 Econowatt fluorescent lamp is preferably a cool-white phosphor which comprises calcium halophosphate activated with manganese and antimony. Similarly the phosphor layer for a conventional Daylight fluorescent lamp contains a two phosphor mix of about 50% white calcium halophosphate activated with antimony and manganese, and about 50% blue halo calcium halophosphate activated with antimony.

We have discovered that replacing the large-particle size phosphor by the same phosphor having an average particle size within the range of about 8 to about 12 micron particle size in Econowatt and about 6.6 to about 10 micron in Daylight/Daylight Deluxe lamps results in a decreased mercury consumption compared to the same lamps produced with the large particle phosphors. This reduction in mercury consumption is determined by the quantity of mercury which is bound on lamp components during operation of the lamp and is thus no longer available for operation of the lamp. As a result of the invention, it is possible to reduce the amount of mercury to be doped in an Econowatt or Daylight/Daylight Deluxe lamps making such lamps more environmentally benign and TCLP compliant.

While the exact reasons for such observations are not known with certainty and we do not wish to be bound by any particular theory, it is believed that due to its smaller particle size, the small-particle phosphor of the invention provides better packing of the molecules of the phosphor coating on the lamp and better shielding of the glass providing an improved barrier that reduces mercury loss in glass.

In lamps of the invention, the initial dose of elemental mercury is provided in such a quantity that:

(A) after about 1,000 hours of lamp operation a sufficient quantity of elemental mercury is available to support a column discharge, and (B) after said lamp is (1) pulverized into granules having a surface area per gram of pulverized material equal to or greater than 3.1 cm$^2$ or having a particle size smaller than 1 cm for the narrowest dimension of said particle and (2) the pulverized material is subjected to a sodium acetate buffer solution having a PH of approximately 4.9 and a weight 20 times that of the pulverized, the TCLP standard. Applicants have discovered that as a result of the use of the small-particle phosphors in a fluorescent lamp as described, TCLP-qualifying standard life lamp can be achieved by selecting the initial dose at a level which is significantly lower than lamps currently available in the market.

This is a real advantage, since the lamps pass the TCLP test through actual reduction in the amount of mercury in the lamp.

Thus the invention in preferred embodiments encompasses an electric lamp which comprises:

A lamp envelope having an inner surface;

means within the lamp envelope for generating ultraviolet radiation; and a layer of a luminescent material comprising a phosphor selected from the group consisting of:

(a) cool white phosphor comprising calcium halophosphate activated with antimony and manganese having an average particle size of about 8 to about 12 microns; and (b) a two phosphor blend of about 50% white calcium halophosphate activated with antimony and manganese and about 50% blue halo calcium halophosphate activated with antimony, wherein the blue halo phosphor has an average particle size of about 6.6 to about 10 microns.

Figure 1:
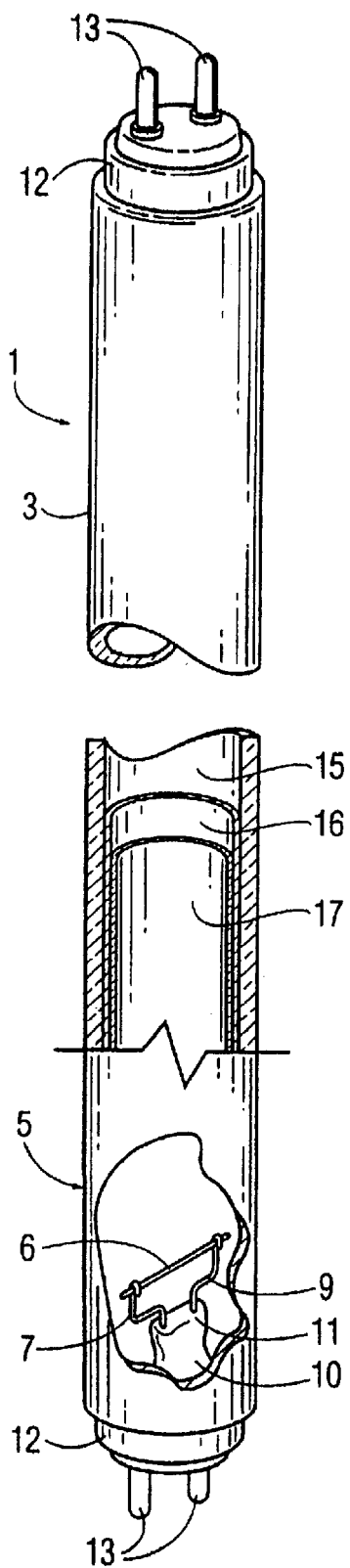
FIG. 1, the sole figure in the application, is a perspective view of a fluorescent lamp according to the invention, partly in cross-section, partly broken away.

The figure is diagrammatic and not to scale.

The invention will be better understood with reference to the details of specific embodiments that follow:

DETAILED DESCRIPTION OF THE PREFERRED EMBODIMENTS

With reference to FIG. 1, there is illustrated a low pressure mercury vapor fluorescent lamp 1 with an elongated lamp vessel, or bulb, 3. The bulb is of a conventional soda-lime glass. The lamp includes an electrode mount structure 5 at each end which includes a coiled tungsten filament 6 supported on conductive feed-throughs 7 and 9 which extend through a glass press seal 11 in a mount stem 10. The mount stem is of a conventional lead-containing glass. The stem 10 seals the envelope in a gas tight manner. The leads 7, 9 are connected to the pin-shaped contacts 13 of their respective bases 12 fixed at opposite ends of the lamp.

Optionally, the inner surface 15 of the outer envelope 3 is provided with a mercury-protective layer or undercoat 16. The layer 16 may be provided to reduce the rate of mercury depletion caused by reactions with the glass of the envelope. The layer 16 may be an oxide formed from the group consisting of magnesium, aluminum, titanium, zirconium and the rare earths. As used herein, the term "rare earths" means the elements scandium, yttrium, lanthanum and the lanthanides. Both coatings extend the full length of the bulb, completely circumferentially around the bulb inner wall. The stems 10 are free of any of the above coatings. A phosphor coating 17 is disposed over the overcoat layer 16.

The discharge-sustaining filling includes an inert gas such as argon, or a mixture of argon and other gases, at a low pressure in combination with a quantity of mercury to sustain an arc discharge during lamp operation.

According to a particular embodiment, the lamp shown in the Figure is an F40T12 ECONOWATT lamp.

EXAMPLE 1

Two groups of F40T12 ECONOWATT lamps were made differing only in the powder weight and average particle size of the cool white phosphors employed. The lamps were provided with a filling of 4.4 mg. of mercury. After 1000 operating hours, the total amount of bound mercury was determined. The results of the mercury consumption tests are given in Table II below.

Table I illustrates the particle size distribution of the conventional phosphors and the phosphors of this invention.

TABLE I

| Phosphor Type | Particle Size Distribution (in microns) | | |
|---|---|---|---|
| | d (10%) | d (50%) | d (90%) |
| Small Particle Cool-white | ≧5.1 | 8.0–12.0 | ≦20.0 |
| Regular Cool-white | ≧6.0 | 12.0–16.0 | ≦29.0 |

TABLE II

| | Control (Regular) Average Particle Size: 13.9 microns | | | Test Lamps (Small Particle) Average Particle Size: 10.6 microns | | |
|---|---|---|---|---|---|---|
| Burning Hours | ID | Powder Weight (gms) | Bound Mercury (mg) | ID | Powder Weight (gms) | Bound Mercury (mg) |
| 1,000 Hours | 1 | 6.4 | 0.914 | 1 | 6.1 | 0.782 |
| | 2 | 6.4 | 0.843 | 2 | 5.8 | 0.787 |
| | 3 | 5.7 | 1.009 | 3 | 5.4 | 0.786 |
| | 4 | 5.2 | 1.027 | 4 | 5.1 | 0.685 |

EXAMPLE 2

Two groups of DAYLIGHT lamps were made differing only in the powder weight and average particle size of the blue halo component of the DAYLIGHT/DAYLIGHT DELUXE phosphors employed. The lamps were provided with a filling of 4.4 mg. of mercury. After 1000 operating hours, the total amount of bound mercury was determined. The results of the mercury consumption tests for the lamps made from the phosphor of the invention were comparable and almost identical to the results given above in Table II.

Table III illustrates the particle size distribution of the conventional phosphors and the phosphors of this invention.

TABLE III

| Phosphor Type | Particle Size Distribution (in microns) | | |
|---|---|---|---|
| | d (10%) | d (50%) | d (90%) |
| Small Particle Blue Halo | ≧2.5 | 6.6–10.0 | ≦16.9 |
| Regular Blue Halo | ≧6.5 | 10.0–15.0 | ≦30.0 |

In addition, the lamps pass the TCLP test and are considered non-hazardous and may be disposed in landfills.

It will be understood that the may be embodied in other specific forms without departing from the spirit and scope or essential characteristics thereof, the present disclosed examples being only preferred embodiments thereof.

We claim:
1. An electric lamp which comprises:
   a lamp envelope having an inner surface;
   means within the lamp envelope for generating ultraviolet radiation; and
   a layer of a luminescent material comprising a phosphor selected from the group consisting of:
   (a) cool white phosphor comprising calcium halophosphate activated with antimony and manganese having an average particle size of about 8 to about 12 microns; and
   (b) a two phosphor blend of about 50% white calcium halophosphate activated with antimony and manganese and about 50% blue halo calcium halophosphate activated with antimony, wherein the blue halo phosphor has an average particle size of about 6.6 to about 10 microns.
2. A low-mercury consumption electric lamp which comprises:
   a lamp envelope having an inner surface;
   means within the lamp envelope for generating ultraviolet radiation; and a layer of a luminescent material comprising a phosphor selected from the group consisting of:
(a) cool white phosphor comprising calcium halophosphate activated with antimony and manganese having an average particle size of about 8 to about 12 microns; and
(b) a two phosphor blend of about 50% white calcium halophosphate activated with antimony and manganese and about 50% blue halo calcium halophosphate activated with antimony, wherein the blue halo phosphor has an average particle size of about 6.6 to about 10 microns.

3. The lamp as claimed in claim 1, wherein said phosphor is a cool-white phosphor comprising calcium halophosphate activated with antimony and manganese having an average particle size of about 8 to about 12 microns.

4. The lamp as claimed in claim 1, wherein said phosphor is a two phosphor blend of about 50% white calcium halophosphate activated with antimony and manganese and about 50% blue halo calcium halophosphate activated with antimony, wherein the blue halo phosphor has an average particle size of about 6.6 to about 10 microns.

5. A low pressure low-mercury consumption mercury vapor fluorescent lamp, comprising:
a. a tubular, light transmissive lamp envelope having opposing sealed ends, an inner tubular surface and enclosing a discharge space between said sealed ends with a volume;
b. a filling of elemental mercury and a rare gas;
c. a pair of discharge electrodes each arranged at a respective sealed end of said lamp envelope;
d. means for connecting said discharge electrodes to a source of electric potential outside of said lamp envelope, whereby during lamp operation a gas discharge is maintained between said discharge electrodes, which gas discharge emits ultraviolet radiation;
e. a first, light transmissive and ultraviolet radiation reflecting layer disposed adjacent said inner surface of said lamp envelope, said first layer comprising a material of predominantly gamma alumina;
f. a layer of a luminescent material comprising a phosphor selected from the group consisting of:
(a) cool white phosphor comprising calcium halophosphate activated with antimony and manganese having an average particle size of about 8 to about 12 microns; and
(b) a two phosphor blend of about 50% white calcium halophosphate activated with antimony and manganese and about 50% blue halo calcium halophosphate activated with antimony, wherein the blue halo phosphor has an average particle size of about 6.6 to about 10 microns.

6. The lamp as claimed in claim 5, wherein said phosphor is a cool-white phosphor comprising calcium halophosphate activated with antimony and manganese having an average particle size of about 8 to about 12 microns.

7. The lamp as claimed in claim 5, wherein said phosphor is a two phosphor blend of about 50% white calcium halophosphate activated with antimony and manganese and about 50% blue halo calcium halophosphate activated with antimony, wherein the blue halo phosphor has an average particle size of about 6.6 to about 10 microns.

* * * * *